(12) United States Patent
Wu et al.

(10) Patent No.: US 9,783,654 B2
(45) Date of Patent: Oct. 10, 2017

(54) ADDITIVES AND METHODS FOR TERMINATING POLYMERIZATION AND/OR REDUCING VISCOSITY OF POLYMER SOLUTION

(71) Applicants: CHINA PETROLEUM & CHEMICAL CORPORATION, Beijing (CN); BEIJING UNIVERSITY OF CHEMICAL TECHNOLOGY, Beijing (CN)

(72) Inventors: Yixian Wu, Beijing (CN); Wei Hua, Beijing (CN); Han Zhu, Beijing (CN); Liangxing Ma, Beijing (CN); Yanqin Hao, Beijing (CN); Ximing Zhao, Beijing (CN); Guojun Zheng, Beijing (CN); Changqing Duan, Beijing (CN); Jun Qi, Beijing (CN); Qijun Mu, Beijing (CN)

(73) Assignees: CHINA PETROLEUM & CHEMICAL CORPORATION, Beijing (CN); BEIJING UNIVERSITY OF CHEMICAL TECHNOLOGY, Beijing (CN)

(*) Notice: Subject to any disclaimer, the term of this patent is extended or adjusted under 35 U.S.C. 154(b) by 731 days.

(21) Appl. No.: 13/721,544

(22) Filed: Dec. 20, 2012

(65) Prior Publication Data
US 2013/0158174 A1    Jun. 20, 2013

(51) Int. Cl.
| C08K 5/09 | (2006.01) |
| C08F 2/42 | (2006.01) |
| C08F 6/02 | (2006.01) |
| C09K 3/00 | (2006.01) |

(52) U.S. Cl.
CPC ............. *C08K 5/09* (2013.01); *C08F 2/42* (2013.01); *C08F 6/02* (2013.01); *C09K 3/00* (2013.01)

(58) Field of Classification Search
None
See application file for complete search history.

(56) References Cited

U.S. PATENT DOCUMENTS

| 4,380,597 A * | 4/1983 | Erwied | C08K 5/098 |
| | | | 252/403 |
| 4,634,744 A | 1/1987 | Hwang et al. | |
| 4,663,405 A | 5/1987 | Throckmorton | |
| 4,736,001 A | 4/1988 | Carbonaro et al. | |
| 4,906,706 A | 3/1990 | Hattori et al. | |
| 5,064,910 A | 11/1991 | Hattori et al. | |
| 5,428,119 A | 6/1995 | Knauf et al. | |
| 5,512,635 A | 4/1996 | Nubel et al. | |
| 5,965,675 A | 10/1999 | Kellum et al. | |
| 6,713,565 B2 | 3/2004 | Burkhart et al. | |
| 6,727,330 B1 | 4/2004 | DeDecker et al. | |
| 7,879,958 B2 | 2/2011 | Luo et al. | |
| 2002/0188092 A1 * | 12/2002 | Moskala | B29C 33/60 |
| | | | 528/272 |
| 2004/0116638 A1 | 6/2004 | Ozawa et al. | |
| 2006/0111519 A1 * | 5/2006 | Strand | C08L 67/02 |
| | | | 525/444 |
| 2008/0099730 A1 * | 5/2008 | Sim | B29C 47/94 |
| | | | 252/400.21 |
| 2008/0171816 A1 | 7/2008 | Spyrou et al. | |
| 2009/0043046 A1 | 2/2009 | Luo et al. | |
| 2009/0043055 A1 | 2/2009 | Luo et al. | |
| 2010/0226868 A1 | 9/2010 | Gamez-Garcia et al. | |
| 2012/0093903 A1 * | 4/2012 | Roth | A61K 9/2846 |
| | | | 424/401 |

FOREIGN PATENT DOCUMENTS

| CN | 86103350 | 11/1986 |
| CN | 1494556 | 5/2004 |
| EP | 0 127 236 | 12/1984 |
| EP | 0201979 A1 | 11/1986 |
| EP | 0 207 558 | 1/1987 |
| EP | 0 386 808 | 9/1990 |
| EP | 0 652 240 | 5/1995 |
| EP | 0 667 357 | 8/1995 |
| EP | 0 957 115 | 5/1999 |
| EP | 1 431 318 | 12/2003 |
| EP | 2050782 | 4/2009 |
| EP | 2065403 | 6/2009 |
| GB | 2132214 A | 7/1984 |
| GB | 886093 | 12/1984 |
| GB | 2 225 586 | 6/1990 |
| JP | 56-24414 | 3/1981 |

(Continued)

OTHER PUBLICATIONS

Near-Monodisperse, n-Alkyl, End-Functionalized Poly(Methyl Vinyl Ether)s: Synthesis by Living Cationic Polymerization and Solution Characterization, Journal of Polymer Science; Part A; Polymer Chemistry; 1998; vol. 38, pp. 2547-2554, Patrickios, C.S. et al.

(Continued)

*Primary Examiner* — Joseph D Anthony
(74) *Attorney, Agent, or Firm* — Finnegan, Henderson, Farabow, Garrett & Dunner, LLP.

(57) ABSTRACT

The present disclosure provides an additive and a method for terminating polymerization and/or reducing viscosity of polymer solution. The additive comprises a carboxylic acid, an alcohol, a salt chosen from alkali metal salts, alkaline earth metal salts, ammonium salts, and any combination thereof, and optionally, water. The method of the present disclosure comprises adding the additive according to present disclosure into a polymer solution and mixing the resulting mixture. The additive of the present disclosure can terminate living polymer chain ends efficiently and can destroy catalytic active centers and can substantially reduce the viscosity of a polymer solution.

14 Claims, No Drawings

(56) References Cited

FOREIGN PATENT DOCUMENTS

| JP | 2006-514132 | | 4/2006 |
|---|---|---|---|
| JP | 2007-217557 | | 8/2007 |
| JP | 2009-179668 | | 8/2009 |
| JP | 2010-508401 | | 3/2010 |
| RU | 2 096 420 | C1 | 11/1997 |
| RU | 2 198 896 | C2 | 2/2003 |
| RU | 2008 132 549 | A | 2/2010 |
| SU | 218776 | A | 12/1968 |
| SU | 430582 | | 6/1978 |
| WO | WO 99/10395 | A1 | 3/1999 |
| WO | WO 2005-073321 | | 8/2005 |
| WO | WO 2006-001185 | | 1/2006 |
| WO | WO2011/012335 | A1 * | 2/2011 |

OTHER PUBLICATIONS

Danish Patent and Trademark Office Singapore Search Report for Application No. 201209408-2; Mar. 11, 2014.
French Search Report and Opinion dated Jun. 9, 2017 for French Application No. 1262404 (5 pages).

* cited by examiner

ADDITIVES AND METHODS FOR TERMINATING POLYMERIZATION AND/OR REDUCING VISCOSITY OF POLYMER SOLUTION

This application claims benefit of Chinese Patent Application No. 201110429505.6, filed Dec. 20, 2011, the contents of which are incorporated herein by reference in its entirety.

The present disclosure generally relates to the field of polymer, particularly relates to an additive and a method for terminating polymerization and/or reducing viscosity of a polymer solution.

During solution polymerization or bulk polymerization of monomers initiated by an initiator or a catalyst, remaining monomers in the system may continue to propagate on a living chain end if the living center has a long life and is not terminated in time and completely, resulting in an increased molecular weight, an increased Mooney viscosity, or increased polymer molecular weight during the storage of polymer solutions, even gelling. Accordingly, the stability of the quality of polymer products is affected.

Viscosity of a polymer solution generally is dependent on the concentration of the polymer solution and the chain structure of the polymer. Viscosity of the polymer solution can be high if the solution has a high concentration; and viscosity of the polymer solution can also be high if the macromolecular chain has a high structural regularity. High viscosity of polymer solution tends to lead to difficult transporting, spraying, agglomerating, post processing, and so on, and results in high energy cost.

In order to control molecular weight and product quality efficiently and to avoid continued chain propagation after discharging of polymerization, it is necessary to terminate growing polymer chain end and stop polymerization reaction timely and efficiently. Moreover, it is necessary to reduce the viscosity of a polymer solution properly while maintaining sufficiently high concentration of the polymer with sufficiently high molecular weight, so as to increase productivity, reduce transportation resistance and energy cost, increase concentration of the polymer, and increase efficiency.

Generally, a terminator is added into a polymerization system, wherein the terminator usually is chosen from water, methanol, ethanol, isopropanol, ethylene glycol, propylene glycol, and any combination thereof. See, for example, US2009/0043055A1, US2009/0043046A1, CN02805285.4, EP1431318, GB2225586A, EP0957115A1, U.S. Pat. Nos. 4,906,706, 5,064,910, EP0652240A1 and U.S. Pat. No. 5,428,119. Since water and small molecular alcohols are polar materials and have poor compatibilities with nonpolar polymer solutions, and since polymer solutions usually have high viscosities, it is difficult to disperse and mix the terminator with polymer solutions quickly and thus it is hard to terminate the polymerization efficiently and completely. In order to enhance the dispersing of the terminator into the polymer solution so as to improve termination effect, higher aliphatic alcohols having 8-18 carbon atoms (see for example EP0207558A1, EP0386808A1, EP0667357A1, CN86103350 and EP0127236A1), or aliphatic carboxylic acids having 8-10 carbon atoms can be used as terminators (see for example U.S. Pat. Nos. 4,663,405 and 6,713,565). However, an additive that can terminate polymerization thoroughly and/or reducing viscosity of a polymer solution efficiently is still desirable.

Disclosed herein is an additive that terminates a polymerization reaction and/or decreases the viscosity of a polymer solution. Further disclosed herein is a method that terminates a polymerization reaction and/or decreases the viscosity of a polymer solution.

According to one aspect, the additive and method according to the present disclosure can be used in solution polymerization or bulk polymerization systems containing living or growing polymer chains.

It is found surprisingly that, when the additive of the present disclosure is mixed with a polymerization system containing living or growing polymer chains, the polymerization reaction can be terminated efficiently and the viscosity of the polymerization system can be decreased, e.g., simultaneously. It is also surprisingly found that, when the additive of the present disclosure is mixed with a polymer solution having a high viscosity, the viscosity of the polymer solution can be decreased effectively.

The present disclosure provides an additive for terminating polymerization and/or reducing viscosity of polymer solution, the additive comprising:
  A. a carboxylic acid,
  B. an alcohol,
  C. a salt chosen from alkali metal salts, alkaline earth metal salts, ammonium salts, and any combination thereof; and
  E. optionally, water.

According to an embodiment of the present disclosure, said additive further comprises component D chosen from amines, phenols, esters, and any combination thereof.

The present disclosure further provides a method for terminating polymerization and/or reducing viscosity of a polymer solution, comprising adding the additive according to the present disclosure into a polymer solution and then mixing the resulting mixture for about 0.5 to about 30 min at a mixing temperature of about −100° C. to about 110° C.; wherein the additive is added in an amount of about 0.4 wt % to about 7.5 wt %, e.g., about 0.7 wt % to about 6.0 wt %, based on the total weight of the polymer in the polymer solution.

In one aspect, the present disclosure provides an additive for terminating polymerization and/or reducing viscosity of polymer solution, comprising:
  A. a carboxylic acid,
  B. an alcohol,
  C. an salt chosen from alkali metal salts, alkaline earth metal salts, ammonium salts, and any combination thereof; and
  E. optionally, water.

In another embodiment of the present disclosure, said additive further comprises component D, chosen from amines, phenols, esters, and any combination thereof.

The component A carboxylic acid according to the present disclosure can be any carboxylic acid known in the art commonly used to terminate a living or growing polymer chain. For example, the component A carboxylic acid can be at least one chosen from saturated aliphatic acids having 6-26 carbon atoms, unsaturated aliphatic acids having 6-26 carbon atoms, and aromatic acids having 7-26 carbon atoms.

As another example, the component A carboxylic acid is at least one chosen from saturated aliphatic acids having 10-20 carbon atoms, unsaturated aliphatic acids having 10-20 carbon atoms, and aromatic acids having 7-20 carbon atoms.

As yet another example, said component A carboxylic acid is at least one chosen from decanoic acid, undecanoic acid, dodecoic acid, tridecanoic acid, myristic acid, pentadecanoic acid, palmitic acid, heptadecanoic acid, stearic acid, hexadecenoic acid, oleic acid, octadecadienoic acid, octadecatrienoic acid, eicosatetraenoic acid, ricinoleic acid, epoxy oleic acid, sebacic acid, dodecanedioic acid, tridecanedioic acid, benzoic acid, methyl benzoic acids, ethyl benzoic acids, propyl benzoic acids, butyl benzoic acid, pentyl benzoic acids, hexyl benzoic acids, phenylacetic acid, phenylpropionic acid, 2,4,6-trimethyl phenylacetic acid, phthalic acids, and phenylene diacetic acids, and isomers thereof, if existing.

In certain embodiments, the content of component A ranges from about 5% to about 50%, for example, from about 8% to about 48%, e.g., from about 10% to about 45%, on the basis of the total weight of the whole additive.

The component B alcohol according to the present disclosure can be any alcohol known in the art commonly used to terminate a living or growing polymer chain. For example, the component B alcohol is at least one chosen from aliphatic alcohols having 1-18 carbon atoms, aromatic alcohols having 7 to 18 carbon atoms, polyvinyl alcohols with a weight-average molecular weight of about 1,000~about 50,000, and any combination thereof. As another example, the component B alcohol can be a ployol described in US application 2009/0043055A1, which is incorporated herein by reference.

As yet another example, the component B alcohol is at least one chosen from methanol, ethanol, n-propanol, i-propanol, n-butanol, i-butanol, t-butanol, n-pentanol, i-pentanol, pentaerythritol, n-hexanol, i-hexanol, heptanol, octanol, decanol, dodecanol, cetyl alcohol, stearyl alcohol, ethylene glycol, propylene glycol, glycerol, cyclohexanol, benzyl alcohol, 2-phenyl ethanol, polyvinyl alcohols with a weight-average molecular weight of about 5,000 to about 40,000, 1,2-ethanediol, 1,2-propanediol, 1,3-propanediol, 2,3-dimethyl-2,3-butanediol, 2,2-dimethyl-1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,5-hexanediol, 1,6-hexanediol, 2,5-hexanediol, diethylene glycol, triethylene glycol, dipropylene glycol, diethanolamine, N-n-butyldiethanolamine, N-t-butyldiethanolamine, 3-thisopropylamino-1,2-propanediol, 1,2-cyclopentanediol, 1,3-cyclopentanediol, 1,2-cyclohexanediol, 1,3-cyclohexanediol, 1,4-cyclohexanediol, 3-methoxy-1,2-propanediol, catechol, 2-hydroxymethyl-1,3-propanediol, 1,2,4-butanetriol, 1,1,1-tris (hydroxymethyl)ethane, 1,2,6-hexane triol, 1,1,1-tris(hydroxymethyl)propane, 1,2,3-heptanetriol, 1,3,5-cyclohexanetriol, pyrogallol, triethanolamine, triisopropanolamine, 1-[N,N-bis(2-hydroxyethyl)amino]-2-propanol, 2-deoxyribose, erythritol, threitol, dihydroxyacetone dimer, glyceraldehyde dimer, fucose, 2-deoxy-galactose, 2-deoxy-glucose, glucose, allose, arabinose, lyxose, ribose, xylose, xylulose, galactose, mannose, tagatose, fructose, melibiose, arabitol, hexahydroxycyclohexane, xylitol, mannitol, and sorbitol.

In certain embodiments, the content of component B ranges from about 5% to about 45%, for example, from about 8% to about 43%, e.g., from about 10% to about 40%, on the basis of the total weight of the whole additive.

The alkali metal salt or alkaline earth metal salt of component C according to the present disclosure can be, for example, a carboxylate, a sulfonate, a sulfate, a phosphate, or any combination thereof. The ammonium salt of component C can be, for example, a primary ammonium salt, a secondary ammonium salt, a tertiary ammonium salt, a quaternary ammonium salt, or any combination thereof. For example, the ammonium salt of component C can be an alkyl-substituted primary ammonium salt, an alkyl-substituted secondary ammonium salt, an alkyl-substituted tertiary ammonium salt, or an alkyl-substituted quaternary ammonium salt.

For example, the component C is at least one chosen from sodium stearate, calcium stearate, sodium oleate, calcium oleate, potassium stearate, sodium laurate, calcium laurate, potassium laurate, sodium dodecyl benzene sulfonate, sodium tetradecyl sulfonate, sodium hexadecyl sulfonate, bis(2-ethylhexyl) sulfosuccinate sodium salt, sodium dibutyl naphthalene sulfonate, sodium lauryl sulfate, sodium polycarboxylate (such as, for example, 2-hydroxy-1,2,3-propanetricarboxylic acid trisodium salt, butanetetracarboxylicacid tetrasodium salt, diethylenetriamine-pentaacetic acid pentasodium salt), octadecyl ammonium chloride, dioctadecyl ammonium chloride, N,N-dimethyl octadecyl ammonium chloride, octadecyl dimethyl benzyl ammonium chloride, polycarboxylic acid sodium salts with a weight-average molecular weight of about 1,000~about 20,000 (such as, for example, sodium polyacrylate, sodium polymaleate, partial esterified styrene-maleic anhydride copolymer sodium salt, partial esterified maleic anhydride-methyl methacrylate copolymer sodium salt), and polycarboxylic acid ammonium salts with a weight-average molecular weight of about 1,000 to about 20,000 (such as, for example, ammonium polyacrylate or ammonium polymaleate).

In certain embodiments, the content of component C ranges from about 2% to about 40%, for example, from about 4% to about 38%, e.g., from about 5% to about 35%, on the basis of the total weight of the whole additive.

The amine of component D of the present disclosure can be chosen, for example, from aromatic amines. For example, the amine is at least one chosen from diphenyl amines, p-phenylene diamines, dihydroquinolines, and derivatives of dihydroquinoline. As another example, the amine is chosen from N-isopropyl-N'-phenyl-p-phenylene diamine, N-(1,3-dimethylbutyl)-N'-phenyl-p-phenylene diamine, N,N'-diphenyl-p-phenylene diamine, octylated diphenylamine, 4,4'-(a,a-dimethylbenzyl)diphenylamine, 2,2,4-trimethyl-1,2-dihydroquinoline, and 6-ethoxy-2,2,4-trimethyl-1,2-dihydroquinoline.

The phenol of component D of the present disclosure can be chosen, for example, from hindered phenols. For example, the phenol is at least one chosen from 2,6-di-tert-butyl-4-methyl phenol, 2,2'-methylene-bis(4-methyl-6-tert-butyl-phenol), 2,2'-methylene-bis(4-ethyl-6-t-butyl-phenol), 4,4'-butylidenebis(3-methyl-6-tert-butyl-phenol), 4,4'-thio-bis(3-methyl-6-t-butyl-phenol), and 2,4-bis(n-octylthioethyl)-6-methylphenol.

The ester of component D of present disclosure can be chosen, for example, from carboxylate esters and phosphites. For example, the ester is at least one chosen from stearyl β-(3,5-di-tert-butyl-4-hydroxyphenyl)propionate, dilauryl thiodipropionate, dimyristyl thiodipropionate, distearyl thiodipropionate, trioctyl phosphite, tri(decyl) phosphite, trilauryl phosphite, and tri(hexadecyl) phosphite.

In certain embodiments, the content of component D (when component D is present) ranges from about 2% to about 25%, for example, from about 4% to about 20%, e.g., from about 5% to about 19%, on the basis of the total weight of the whole additive.

The component E water of the additive of the present disclosure is an optional component; that is, the additive of present disclosure may comprise water or may comprise no water. In certain embodiments, the content of component E ranges from about 0 to about 60%, for example, from about 0 to about 55%, e.g., from about 0 to about 52%, on the basis of the total weight of the whole additive. In certain embodiments, there are no particular limits to the water, provided the technical effects of the present disclosure are not impaired. For example, tap water, deionized water, pure water, purified water, distilled water and the like can be used. In one embodiment, the conductivity of the water is less than 500 μS/cm, for example, less than 100 μS/cm, e.g., less than 10 μS/cm.

In one embodiment of the present disclosure, the additive of present disclosure comprises:
A. from about 5% to about 50%, for example, from about 8% to about 48%, e.g., from about 10% to about 45%, of carboxylic acid, on the basis of the total weight of the whole additive;
B. from about 5% to about 45%, for example, from about 8% to about 43%, e.g., from about 10% to about 40%, of alcohol, on the basis of the total weight of the whole additive;
C. from about 2% to about 40%, for example, from about 4% to about 38%, e.g., from about 5% to about 35%, of salt, on the basis of the total weight of the whole additive, wherein the salt is at least one chosen from alkali meta salts, alkaline earth metal salts, and ammonium salts; and
E. optionally, from about 0 to about 60%, for example, from about 0 to about 55%, e.g., from about 0 to about 52%, of water, on the basis of the total weight of the whole additive.

In another embodiment of the present disclosure, the additive of present disclosure comprises:
A. from about 5% to about 50%, for example, from about 8% to about 48%, e.g., from about 10% to about 45%, of carboxylic acid, on the basis of the total weight of the whole additive;
B. from about 5% to about 45%, for example, from about 8% to about 43%, e.g., from about 10% to about 40%, of alcohol, on the basis of the total weight of the whole additive;
C. from about 2% to about 40%, for example, from about 4% to about 38%, e.g., from about 5% to about 35%, of salt, on the basis of the total weight of the whole additive wherein the salt is at least one chosen from alkali metal salts, alkaline earth metal salts, ammonium salts;
D. from about 2% to about 25%, for example, from about 4% to about 20%, e.g., from about 5% to about 19%, of at least one chosen from amines, phenols, and esters, on the basis of the total weight of the whole additive; and
E. optionally, from about 0 to about 60% or example, from about 0 to about 55%, e.g., from about 0 to about 52%, of water, on the basis of the total weight of the whole additive.

A further aspect of the present disclosure relates to a method for terminating polymerization and/or decreasing viscosity of polymer solution, comprising adding the additive according to the present disclosure into a polymer solution and mixing the resulting mixture, e.g., homogeneously.

In certain embodiment, the method of present disclosure comprises adding said additive into a polymer solution containing living or growing polymer chains such as those polymer solutions obtained by solution polymerization or bulk polymerization, or adding said additive into a preformed polymer solution, and then mixing the resulting mixture homogeneously. As will be appreciated by those skilled in the art, the method of the present disclosure has no particular limits to the solution polymerization or bulk polymerization, and the solution polymerization or bulk polymerization can be any solution polymerization or bulk polymerization. Said preformed polymer solution means a polymer solution obtained by adding a polymer into a solvent and then dissolving the polymer in solvent, wherein the polymer can be, for example, a commercial available polymer.

Surprisingly, the inventors of the present disclosure found that the additive of the present disclosure not only decreases the viscosity of a polymer solution but also terminates polymerization reaction in a polymer solution containing living or growing polymer chains obtained by solution polymerization or bulk polymerization (excellent dual effects), or decreases the viscosity of a preformed polymer solution significantly.

The mixing of the additive and the polymer solution mentioned above can be conducted via various mixing modes, such as, for example, mixing by mechanical agitation, or by using a static mixer or a dynamic mixer. When mixed homogeneously, the additive of the present disclosure can terminate polymerization efficiently (if living or growing polymer chains exist in the polymer solution) such that the molecule weight of the polymer is maintained unchanged. In addition, the additive of the present disclosure can reduce the viscosity of the polymer solution. According to an embodiment of the present disclosure, the viscosity of the polymer solution can be decreased to lower than 5000 mPa·s, or even lower than 1400 mPa·s. According to an embodiment of the present disclosure, the viscosity of the polymer solution can be decreased by from about 20% to about 90%, e.g., from about 28% to about 85%, relative to the viscosity of the polymer solution before adding the additive of present disclosure.

There are no particular limits to the concentration of the polymer solution. In certain embodiments, the polymer solution in the present disclosure has a concentration of from about 50 to about 350 g/L.

Components A, B, C, D (if present), and E (if present) in the additive of the present disclosure, independently with each other, can be used directly, such as used in a commercially available form, or can be formulated into a solution with a solvent before use. The solvent can be a solvent identical to that used in the polymer solution, water (i.e. component E of the present disclosure), or any solvent that does not impair the effects of present invention substantially.

There are no particular limits to the addition mode of the additive in the method of the present disclosure. Components A, B, C, D (if present), and E (if present) in the additive can be added, in desired amounts, into a polymer solution through, for example, the following addition modes:
  adding each component separately into the polymer solution;
  adding one or more mixture(s) obtained by mixing any two, three, or four components and remaining component(s) separately into the polymer solution; or
  mixing all components together and then adding the resulting mixture into the polymer solution.

There are no particular limits to the addition sequence of said components or mixture(s) thereof.

After the additive is added into a polymer solution, mixing can be conducted. There are no particular limits to mixing temperature and mixing period. For example, the mixing temperature can be from about −100° C. to about 110° C. For example, the mixing period can be from about 0.5 min to about 30 min, e.g., from about 2 min to about 20 min.

Those skilled in the art can determine the suitable amount of the additive of the present disclosure. Without wishing to be bound by any theory, it is believed that the suitable level of the additive of the present disclosure is relevant to the content and the molecule weight of the polymer in the polymer solution. Generally, the higher the content or molecule weight of the polymer, the higher the suitable level of the additive. In certain embodiments, the amount of the additive used ranges from about 0.4% to about 7.5%, for example, from about 0.7% to about 6.0%, e.g., from about 1.3% to about 5.0%, on the basis of the weight of the polymer.

According to an embodiment of the present disclosure, the component E water (in whole or in part) can be mixed with component B and/or C and then added into the polymer solution, or component E water can be added into the solution after all other components are added into the polymer solution.

There are no particular limits to the types of the polymer in polymer solutions of present disclosure. For example, said polymer can be any polymer that can be obtained through solution polymerization or bulk polymerization. According to an embodiment of present disclosure, the polymer in the polymer solution systems in which the additive of present disclosure is applicable is chosen, for example, from polybutadiene, polyisoprene, polystyrene, butadiene-isoprene copolymer, styrene-butadiene copolymer, styrene-isoprene copolymer, butadiene-isoprene-styrene copolymer, ethylene-propylene copolymer, ethylene-propylene-ethylidene-2-norbornene copolymer, ethylene-propylene-dicyclopentadiene copolymer, polyisobutene, isobutene-isoprene copolymer, and isobutene-p-methyl styrene copolymer.

There are no particular limits to the solvent used in the polymer solution of the present disclosure. Those skilled in the art can select an appropriate solvent according to, for example, the type of the polymer. According to an embodiment of present disclosure, said solvent can be the solvent used in solution polymerization or bulk polymerization. According to an embodiment of present disclosure, the solvent used in the polymer solution is chosen from alkane, alkene, cycloalkane, aromatic hydrocarbon, halohydrocarbon, and any combination thereof.

It is believed that the additive of the present disclosure, when mixed with a polymer reaction solution containing living or growing polymer chains, can terminate living or growing polymer chain ends efficiently and can destroy the initiating or catalytic active centers, so as to terminate polymerization reaction effectively. Moreover, said additive of present disclosure can reduce the viscosity of a polymer solution substantially. For example, the viscosity of the polymer solution can be reduced by from about 20% to about 90%, relative to the viscosity of the polymer solution before addition of the additive. In certain embodiments, the additive of the present disclosure achieves the dual effects of terminating polymerization reaction completely (terminating living or growing polymer chains and destroying the initiating or catalytic active centers) and reducing viscosity of polymer solution substantially.

The additive of the present disclosure, due to reduction of the viscosity of a polymer solution, is capable of reducing the transportation resistance and energy cost of high-viscosity polymer solution and thus is beneficial to increasing the concentration of the polymer solution, productivity, and output and to maintaining product quality and stability Further, it is believed that most of the additive is maintained in the polymer and can further stabilize the polymer and improve processability.

EXAMPLES

The following non-limiting examples are provided to further illustrate the disclosure.

Testing Procedures:
1. Viscosity of polymer solution: determined by using Digital Rotational Viscometer NDJ-5S from Shanghai Hengping Scientific Instrument Co., Ltd according to GB/T2794-1995.
2. Weight average molecular weight of polymer: determined by using Mode 1515 Gel Permeation Chromatography from Waters Corp. under following conditions:
   solvent: tetrahydrofuran;
   polymer: being formulated into solution at 1.5 g/L;
   columns: four columns HT3, HT4, HT5 and HT6 being equipped;
   eluting solvent: tetrahydrofuran;
   temperature: 30° C.; and
   calibration is performed using polystyrene standards.

Materials Used in Examples:
Butadiene, styrene, and isoprene were obtained from Tianjin Lilang Chemical Scientific and Tech Co., Ltd;
   sebacic acid, octadecenoic-9-acid (A), and stearic acid were obtained from Jinan Hongxin Chemical Co., LTD;
Ethanol, ethylene glycol, isopropanol, butanol, cyclohexanol, glycerol, and polyvinyl alcohol with different molecular eights were obtained from Beijing Yili Fine Chemicals Co., Ltd;
Calcium stearate, sodium dodecyl benzene sulfonate, N,N-dimethyl octadecyl ammonium chloride, sodium polyacrylate, sodium polymaleate, ammonium polyacrylate, partial esterified styrene-maleic anhydride copolymer sodium salt, and partial esterified maleic anhydride-methyl methacrylate copolymer sodium salt with different molecular weights were obtained from Beijing Tongguang Fine Chemicals Company;
Stearyl β-(3,5-di-tert-butyl-4-hydroxyphenyl)propionate, 2,4-bis(n-octylthiomethyl)-6-methylphenol, 2,6-di-tert-butyl-4-methylphenol, tri(hexadecyl) phosphite, and N-isopropyl-N'-phenyl-p-phenylene diamine were obtained from JiYi Chemical (Beijing) Co., Ltd.

Example 1

Into a polymerization system containing living or growing polybutadiene chains and hexane produced via the solution polymerization of butadiene in hexane at 35° C., a mixed liquid of octadecenoic-9-acid (A), butanol (B), sodium polyacrylate having a Mw of 8000 (C), stearyl β-(3,5-di-tert-butyl-4-hydroxyphenyl)propionate (D), 2,4-bis(n-octylthioethyl)-6-methylphenol (D) and water (E) were added to obtain a polymer solution, wherein the amounts of components A, B, C, D, and E were respectively 0.25%, 0.28%, 0.25%, 0.2%, and 1.0% by weight on the basis of the polybutadiene polymer, and wherein the ratio of stearyl β-(3,5-di-tert-butyl-4-hydroxyphenyl)propionate (D) to 2,4-bis(n-octylthiomethyl)-6-methylphenol (D) was 3:1 by weight. The polymerization solution was mixed for 0.5 min and the viscosity of the polymer solution was decreased from 22000 mPa·s to 3300 mPa·s (decreased by 85%). The molecular weight of the polymer was maintained unchanged after the polymer solution was left to stand for 168 hours. The weight average molecular weights (Mw) of the polymer, after mixing for 0.5 min and after being left stand for 168 hours, were both around $1.5 \times 10^6$.

Example 2

Into a polymerization system containing living or growing polyisoprene chains and isoprene produced from bulk polymerization of isoprene, at a temperature of 15° C., a mixed liquid of octadecenoic-9-acid (A) and ethanol (B), a mixed solution of calcium stearate (C) and water (E), and 2,6-di-tert-butyl-4-methylphenol (D) were added sequentially to obtain a polymer solution, wherein the amounts of components A, B, C, D and E were respectively 0.8%, 0.8%, 0.8%, 0.3%, and 2.0% by weight on the basis of the polyisoprene polymer. The polymer solution was mixed for 10 min after all components were added in and the viscosity of the polymer solution was decreased from 12600 mPa·s to 4300 mPa·s (decreased by 66%). The molecular weight of the polymer was maintained almost unchanged after the polymer solution was left to stand for 48 hours. The weight average molecular weights (Mw) of the polymer, after mixing for 10 min and after being left stand for 48 hours, were both $9.8 \times 10^5$.

Example 3

Into a polymerization system containing living or growing polybutadiene chains and hexane-cyclohexane solvent mixture produced from solution polymerization of butadiene in hexane-cyclohexane solvent mixture, at a temperature of 25° C., octadecenoic-9-acid (A), ethylene glycol (B), polyvinyl alcohol having a Mw of 35000 (B), a mixed solution of partial esterified styrene-maleic anhydride copolymer sodium salt having a Mw of 5000 (C) and water (E), and stearyl β-(3,5-di-tert-butyl-4-hydroxyphenyl)propionate (D), and tri(hexadecyl) phosphite (D) were added sequentially to obtain a polymer solution, wherein the amounts of components A, B, C, D and E were respectively 0.95%, 1%, 0.25%, 0.5%, and 1.0% by weight on the basis of the polybutadiene polymer, and wherein the ratio by weight between ethylene glycol and polyvinyl alcohol was 20:1, the ratio by weight between stearyl β-(3,5-di-tert-butyl-4-hydroxyphenyl)propionate (D) and tri(hexadecyl) phosphite (D) was 40:1. The polymer solution was mixed for 20 min and the viscosity of the solution was decreased from 6300 mPa·s to 1400 mPa·s (decreased by 77%). The molecular weight of the polymer was maintained unchanged after the polymer solution was left to stand for 24 hours. The weight average molecular weights (Mw) of the polymer, after mixing for 20 min and after being left stand for 24 hours, were both $3.8 \times 10^5$.

Example 4

At a temperature of 25° C., 2,6-di-tert-butyl-4-methylphenol (D), a mixture of sebacic acid (A) and isopropanol (B), sodium polymaleate having a Mw of 3000 (C) and partial esterified maleic anhydride-methyl methacrylate copolymer sodium salt (C) having a Mw of 2000 were added sequentially into a butadiene-styrene copolymer/cyclohexane solution to obtain a polymer solution, wherein the amounts of components A, B, C, and D were respectively 1.0%, 0.88%, 0.18%, and 0.22% by weight on the basis of the butadiene-styrene copolymer. The butadiene-styrene copolymer/cyclohexane solution was obtained by dissolving the butadiene-styrene copolymer into cyclohexane with a concentration of 80 g/L. The polymer solution was mixed for 5 min and the viscosity of the solution was decreased from 2900 mPa·s to 1700 mPa·s (decreased by 41%). The weight average molecular weights (Mw) of the polymer, after mixing for 5 min and after being left stand for 48 hours, were both $2.5 \times 10^5$.

Example 5

Into a polymerization system containing living or growing isobutene-isoprene copolymer chains and hexane-chloroethane solvent mixture produced from solution polymerization of isobutene-isoprene in hexane-chloroethane mixed solvent, at a temperature of −80° C., 2,6-di-tert-butyl-4-methylphenol (D), a mixture of epoxy oleic acid (A) and ethylene glycol (B), and sodium dodecyl benzene sulfonate (C) were added sequentially to obtain a polymer solution, wherein the amounts of components A, B, C and D were respectively 0.5%, 0.5%, 0.4% and 0.3% by weight on the basis of the isobutene-isoprene copolymer. The polymer solution was mixed for 10 min and the viscosity of the solution was decreased from 3100 mPa·s to 2100 mPa·s (decreased by 32%). The molecular weight of the polymer was maintained unchanged after the polymer solution was left to stand for 24 hours. The weight average molecular weights (Mw) of the polymer, after mixing for 10 min and after being left stand for 24 hours, were both $4.5 \times 10^5$.

Example 6

Into a polymerization system containing living or growing polybutadiene and hexane-cyclohexane solvent mixture produced from solution polymerization of butadiene in hexane-cyclohexane, at a temperature of 40° C., ammonium polyacrylate having a Mw of 15000 (C), eicosatetraenoic acid (A), isopropanol (B), and cyclohexanol (B), and stearyl β-(3,5-di-tert-butyl-4-hydroxyphenyl)propionate (D) and N-isopropyl-N'-phenyl-p-phenylene diamine (D) were added sequentially to obtain a polymer solution, wherein the amounts of components A, B, C and D were respectively 0.5%, 0.6%, 0.6% and 0.2% by weight on the basis of the polybutadiene polymer, and wherein the ratio by weight between isopropanol and cyclohexanol was 1:20, the weight ratio of stearyl β-(3,5-di-tert-butyl-4-hydroxyphenyl)propionate to N-isopropyl-N'-phenyl-p-phenylene diamine was 1:25. The polymer solution was mixed for 3 min and the viscosity of the solution was decreased from 3200 mPa·s to 2200 mPa·s (decreased by 31%). The molecular weight of the polymer was maintained unchanged after the polymer solution was left to stand for 120 hours. The weight average molecular weights (Mw) of the polymer, after mixing for 3 min and after being left stand for 120 hours, were both $3.1 \times 10^5$.

Example 7

Into a polymerization system containing living or growing polybutadiene and hexane-cyclohexane solvent mixture produced from solution polymerization of butadiene in hexane-cyclohexane mixed solvent, at a temperature of 60° C., a mixed solution of stearic acid (A) and glycerol (B), a mixed solution of N,N-dimethyl octadecyl ammonium chloride (C) and water (E), and stearyl β-(3,5-di-tert-butyl-4-hydroxyphenyl)propionate (D) and 2,4-bis(n-actylthiomethyl)-6-methylphenol (D) were added sequentially to obtain a polymer solution, wherein the amounts of components A, B, C, D, and E were respectively 0.8%, 0.8%, 0.5%, 0.5%, and 2.0 by weight on the basis of the polybutadiene polymer, and wherein the ratio by weight of stearyl β-(3,5-di-tert-butyl-4-hydroxyphenyl)propionate to 2,4-bis (n-octylthiomethyl)-6-methylphenol was 1:1. The polymer solution was mixed for 5 min and the viscosity of the solution was decreased from 3200 mPa·s to 2100 mPa·s (decreased by 34%). The molecular weight of the polymer was maintained unchanged after the polymer solution was left to stand for 120 hours. The weight average molecular weights (Mw) of the polymer, after mixing for 5 min and after being left stand for 120 hours, were both $3.1 \times 10^5$.

Example 8

Into a polymerization system containing living or growing polybutadiene and hexane produced from the solution polymerization of butadiene in hexane, at a temperature of 80° C., octadecenoic-9-acid (A), butanol (B), and sodium polymaleate having a Mw of 5000 (C) were added sequentially to obtain a polymer solution, wherein the amounts of components A, B and C were respectively 0.5%, 0.3%, and 0.25% on the basis of the polybutadiene polymer. The polymer solution was mixed for 5 min and the viscosity of the polymer solution was decreased from 9300 mPa·s to 6400 mPa·s. The molecular weight of the polymer was maintained unchanged after the polymer solution was left to stand for 48 hours. The weight average molecular weights (Mw) of the polymer, after mixing for 5 min and after being left stand for 48 hours, were both $4.2 \times 10^5$.

Example 9

Into a polymerization system containing living or growing polybutadiene and hexane produced from the solution polymerization of butadiene in hexane, at a temperature of 50° C., octadecenoic-9-acid (A), butanol (B), ammonium polyacrylate having a Mw of 15000 (C), and water (E) were added sequentially to obtain a polymer solution, wherein the amounts of components A, B, C, and E were respectively 1.0%, 0.25%, 0.25%, and 2% by weight on the basis of the polybutadiene polymer. The polymer solution was mixed for 5 min and the viscosity of the polymer solution was decreased from 9600 mPa·s to 6700 mPa·s. The molecular weight of the polymer was maintained unchanged after the polymer solution was left to stand for 48 hours. The weight average molecular weights (Mw) of the polymer, after mixing for 10 min and after being left stand for 48 hours, were both $4.0 \times 10^5$.

Comparative Example 1

Into a polymerization system containing living or growing polybutadiene and hexane produced from the solution polymerization of butadiene in hexane, at a temperature of 60° C., octadecenoic-9-acid in amount of 0.8% by weight on the basis of the polybutadiene polymer was added. The weight average molecular weight (Mw) of the polymer, after mixing for 5 min and after being left stand for 24 hours, were determined to be $1.1 \times 10^6$ and $1.4 \times 10^6$, respectively. It appeared that the polymerization was not terminated effectively, leading to an increasing of molecular weight during standing and consequently resulting in an increased viscosity (from 13000 mPa·s to 37000 mPa·s).

Comparative Example 2

Into a polymerization system containing living or growing polybutadiene and hexane produced from the solution polymerization of butadiene in hexane, at a temperature of 50° C., ethanol in amount of 0.5% by weight and water in amount of 0.8% by weight, both on the basis of the polybutadiene polymer, were added. The weight average molecular weight (Mw) of the polymer, after mixing for 5 min and after being left stand for 48 hours, were determined to be $3.5 \times 10^5$ and $5.8 \times 10^5$, respectively. It appeared that the polymerization was not terminated effectively, leading to an increasing of molecular weight during standing and consequently resulting in an increased viscosity (from 4000 mPa·s to 10000 mPa·s).

What is claimed is:

1. An additive for terminating polymerization and/or reducing viscosity of a polymer solution, comprising components:
    A. from about 5% to about 50%, on the basis of the total weight of the additive, of at least one carboxylic acid chosen from saturated aliphatic acids having 6-26 carbon atoms, unsaturated aliphatic acids having 6-26 carbon atoms, and aromatic acids having 7-26 carbon atoms;
    B. from about 5% to about 45%, on the basis of the total weight of the additive, of at least one alcohol chosen from aliphatic alcohols having 1-18 carbon atoms, aromatic alcohols having 7-18 carbon atoms, and polyvinyl alcohols with a weight-average molecular weight of about 1,000 to about 50,000;
    C. from about 2% to about 40%, on the basis of the total weight of the additive, of at least one salt chosen from alkali metal salts, alkaline earth metal salts, and ammonium salts;
    D. at least one component D selected from:
        aromatic amines selected from diphenyl amines, p-phenylene diamines, dihydroquinolines, and derivatives of dihydroquinoline;
        hindered phenols selected from 2,6-di-tert-butyl-4-methyl phenol, 2,2'-methylene-bis(4-methyl-6-tert-butyl-phenol), 2,2'-methylene-bis(4-ethyl-6-tert-butyl-phenol), 4,4'-abutylidenebis(3-methyl-6-tert-butyl-phenol), 4,4'-thio-bis(3-methyl-6-t-butyl-phenol), and 2,4-bis(n-octylthiomethyl)-6-methylphenol; and
        carboxylate esters and phosphites selected from stearyl β-(3,5-di-tert-butyl-4-hydroxyphenyl)propionate, dilauryl thiodipropionate, dimyristyl thiodipropionate, distearyl thiodipropionate, trioctyl phosphite, tri(decyl) phosphite, trilauryl phosphite, and tri(hexadecyl) phosphite; and
    E. optionally, water;
    wherein the additive is used in an amount of from about 0.4% to about 7.5%, on the basis of the weight of the polymer in the polymerization or in the polymer solution; and
    wherein if the additive reduces the viscosity of a polymer solution, then the viscosity is reduced by from about 20% to about 90% relative to the viscosity of the polymer solution before addition of the additive.

2. The additive according to claim 1, wherein the contents of the components A, B, C, D, and E in the additive range respectively from about 5% to about 50%, from about 5% to about 45%, from about 2% to about 40%, from about 2% to about 25%, and from about 0 to about 60%, on the basis of the total weight of the additive.

3. The additive according to claim 1, wherein the at least one carboxylic acid of component A is chosen from saturated aliphatic acids having 10-20 carbon atoms, unsaturated aliphatic acids having 10-20 carbon atoms, and aromatic acids having 7-20 ecarbon atoms.

4. The additive according to claim 1, wherein the at least one alcohol of component B is chosen from methanol, ethanol, n-propanol, i-propanol, n-butanol, i-butanol, t-butanol, n-pentanol, i-pentanol, pentaerythritol, n-hexanol, i-hexanol, heptanol, octanol, decanol, dodecanol, cetyl alcohol, stearyl alcohol, ethylene glycol, propylene glycol, glycerol, cyclohexanol, benzyl alcohol, 2-phenyl ethanol, polyvinyl alcohols with a weight-average molecular weight of about 5,000 to about 40,000, 1,2-ethanediol, 1,2-propanediol, 1,3-propanediol, 2,3-dimethyl-2,3-butanediol, 2,2-dimethyl-1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,5-hexanediol, 1,6-hexanediol, 2,5-hexanediol, diethylene glycol, triethylene glycol, dipropylene glycol, diethanolamine, N-n-butyldiethanolamine, N-t-butyldiethanolamine, 3-diisopropylamino-1,2-propanediol, 1,2-cyclopentanediol, 1,3-cyclopentanediol, 1,2-cyclohexanediol, 1,3-cyclohexanediol, 1,4-cyclohexanediol, 3-methoxy-1,2-propanediol, catechol, 2-hydroxymethyl-1,3-propanediol, 1,2,4-butanetriol, 1,1,1-tris (hydroxymethyl)ethane, 1,2,6-hexanetriol, 1,1,1-tris(hydroxymethyl)propane, 1,2,3-heptanetriol, 1,3,5-cyclohexanetriol, pyrogallol, triethanolamine, triisopropanolamine, 1-[N,N-bis(2-hydroxyethyl)amino]-2-propanol, 2-deoxyribose, erythritol, threitol, 1,3-dihydroxyacetone dimer, glyceraldehyde dimer, fucose, 2-deoxy-galactose, 2-deoxy-glucose, glucose, allose, arabinose, lyxose, ribose, xylose, xylulose, galactose, mannose, tagatose, fructose, melibiose, arabitol, hexahydroxycyclohexane, xylitol, mannitol, and sorbitol.

5. The additive according to claim 1, wherein:
the alkali metal salt and alkaline earth metal salt of component C salt are independently chosen from a carboxylate, a sulfonate, a sulfate, and a phosphate; and
the ammonium salt of component C is chosen from a primary ammonium salt, a secondary ammonium salt, a tertiary ammonium salt, and a quaternary ammonium salt.

6. The additive according to claim 5, wherein the component C is chosen from sodium stearate, calcium stearate, sodium oleate, calcium oleate, potassium stearate, sodium laurate, calcium laurate, potassium laurate, sodium dodecyl benzene sulfonate, sodium tetradecyl sulfonate, sodium hexadecyl sulfonate, bis(2-ethylhexyl) sulfosuccinate sodium salt, sodium dibutyl naphthalene sulfonate, sodium lauryl sulfate, sodium polycarboxylate, octadecyl ammonium chloride, dioctadecyl ammonium chloride, octadecyl dimethyl ammonium chloride, octadecyl dimethyl benzyl ammonium chloride, polycarboxylic acid sodium salts with a weight-average molecular weight of about 1,000 to about 20,000, and polycarboxylic acid ammonium salts with a weight-average molecular weight of about 1,000 to about 20,000.

7. A method for terminating polymerization and/or reducing viscosity of a polymer solution, including adding the additive according to claim 1 into the polymer solution and then mixing the resulting mixture for about 0.5 to about 30 min at a mixing temperature of about −100° C. to about 110° C.; wherein the additive is added in an amount of about 0.4 wt % to about 7.5 wt % based on the total weight of the polymer in the polymer solution.

8. The method according to claim 7, wherein the polymer solution contains living polymer chains.

9. The method according to claim 7, wherein the polymer solution is obtained from a solution polymerization or a bulk polymerization, or the polymer solution is obtained by dissolving a polymer in a solvent.

10. The method according to claim 7, wherein the additive is added in an amount of about 0.7 wt % to about 6.0 wt %, based on the total weight of the polymer in the polymer solution.

11. The additive according to claim 2, wherein the contents of the components A, B, C, D, and E in the additive range respectively from about 8% to about 48%, from about 8% to about 43%, from about 4% to about 38%, from about 4% to about 20%, and from about 0 to about 55%, on the basis of the total weight of the additive.

12. The additive according to claim 3, wherein the at least one carboxylic acid of component A is chosen from decanoic acid, undecanoic acid, dodecoic acid, tridecanoic acid, myristic acid, pentadecanoic acid, palmitic acid, heptadecanoic acid, stearic acid, hexadecenoic acid, octadecenoic acid, octadecadienoic acid, octadecatrienoic acid, eicosatetraenoic acid, ricinoleic acid, epoxy oleic acid, sebacic acid, dodecanedioic acid, tridecanedioic acid, benzoic acid, methyl benzoic acid, ethyl benzoic acid, propyl benzoic acid, butyl benzoic acid, pentyl benzoic acid, hexyl benzoic acid, phenylacetic acid, phenylpropionic acid, 2,4,6-trimethyl phenylacetic acid, phthalic acid, and phenylene diacetic acid.

13. The additive according to claim 5, wherein the ammonium salt of component C is chosen from an alkyl-substituted primary ammonium salt, an alkyl-substituted secondary ammonium salt, an alkyl-substituted tertiary ammonium salt, and an alkyl-substituted quaternary ammonium salt.

14. The additive according to claim 1, wherein the aromatic amine is chosen from N-isopropyl-N'-phenyl-p-phenylene diamine, N-(1,3-dimethylbutyl)- N'-phenyl-p-phenylene diamine, N,N'-diphenyl-p-phenylene diamine, octylated diphenylamine, 4,4'-(a,a-dimethylbenzyl) diphenylamine, 2,2,4-trimethyl-1,2-dihydroquinoline, and 6-ethoxy-2,2,4-trimethyl-1,2-dihydroquinoline.

* * * * *

UNITED STATES PATENT AND TRADEMARK OFFICE
CERTIFICATE OF CORRECTION

PATENT NO. : 9,783,654 B2
APPLICATION NO. : 13/721544
DATED : October 10, 2017
INVENTOR(S) : Yixian Wu et al.

It is certified that error appears in the above-identified patent and that said Letters Patent is hereby corrected as shown below:

On the Title Page

After Item (65), the Prior Publication Data, insert missing Item (30), the Foreign Application Priority Data:
--(30) Foreign Application Priority Data
Dec. 20, 2011 (CN).......................201110429505.6--.

In Item (57), the Abstract, Lines 7-8:
"according to present disclosure" should read --according to the present disclosure--.

In the Claims

In Claim 1, Column 12, Lines 40-41:
"4,4'-abutylidenebis(3-methyl-6-tert-butyl-phenol)," should read
--4,4'-butylidenebis(3-methyl-6-tert-butyl-phenol),--.

In Claim 3, Column 13, Line 2:
"7-20 ecarbon atoms." should read --7-20 carbon atoms.--.

In Claim 12, Column 14, Line 30:
"dodecoic acid," should read --dodecanoic acid,--.

Signed and Sealed this
Twenty-fourth Day of April, 2018

Andrei Iancu
*Director of the United States Patent and Trademark Office*